(12) United States Patent
Sugiura et al.

(10) Patent No.: US 9,214,682 B2
(45) Date of Patent: Dec. 15, 2015

(54) FUEL CELL

(75) Inventors: Seiji Sugiura, Utsunomiya (JP); Yasuhiro Watanabe, Kawaguchi (JP)

(73) Assignee: Honda Motor Co., Ltd., Tokyo (JP)

( * ) Notice: Subject to any disclaimer, the term of this patent is extended or adjusted under 35 U.S.C. 154(b) by 808 days.

(21) Appl. No.: 12/623,829

(22) Filed: Nov. 23, 2009

(65) Prior Publication Data

US 2010/0129694 A1 May 27, 2010

(30) Foreign Application Priority Data

Nov. 26, 2008 (JP) ................. 2008-300713

(51) Int. Cl.
*H01M 8/02* (2006.01)
*H01M 8/10* (2006.01)

(52) U.S. Cl.
CPC ............ *H01M 8/026* (2013.01); *H01M 8/0258* (2013.01); *H01M 2008/1095* (2013.01); *Y02E 60/50* (2013.01)

(58) Field of Classification Search
None
See application file for complete search history.

(56) References Cited

U.S. PATENT DOCUMENTS

| | | | |
|---|---|---|---|
| 6,884,536 B1 * | 4/2005 | Hatoh et al. | 429/433 |
| 2005/0118489 A1 * | 6/2005 | Frederiksen et al. | 429/38 |
| 2005/0186464 A1 * | 8/2005 | Sugiura et al. | 429/38 |
| 2006/0078763 A1 | 4/2006 | Toro et al. | |
| 2007/0009781 A1 * | 1/2007 | Dong | 429/38 |
| 2008/0070080 A1 | 3/2008 | Miyazaki | |
| 2009/0162717 A1 * | 6/2009 | Nakagawa et al. | 429/30 |

FOREIGN PATENT DOCUMENTS

| | | |
|---|---|---|
| JP | 11-16590 | 1/1999 |
| JP | 2006-505910 | 2/2006 |
| JP | 2006-172924 A1 | 6/2006 |
| WO | WO 2007/148761 | * 12/2007 |

OTHER PUBLICATIONS

Japanese Office Action for Application No. 2008-300713, dated Apr. 26, 2011.
Japanese Office Action for Application No. 2012-000555, 3 pages, dated Feb. 12, 2012.

* cited by examiner

*Primary Examiner* — Alix Eggerding
(74) *Attorney, Agent, or Firm* — Nelson Mullins Riley & Scarborough LLP; Anthony A. Laurentano (57) ABSTRACT

A fuel cell is formed by sandwiching a membrane electrode assembly between a first separator and a second separator. A fuel gas flow field is formed in the second separator. An inlet buffer is connected to the inlet of the fuel gas flow field, and an outlet buffer is connected to an outlet of the fuel gas flow field. The inlet buffer is deeper than the outlet buffer. Therefore, the pressure loss in the inlet buffer is smaller than the pressure loss in the outlet buffer.

4 Claims, 10 Drawing Sheets

FUEL CELL

CROSS-REFERENCE TO RELATED APPLICATION

This application is based upon and claims the benefit of priority from Patent Application No. 2008-300713 filed on Nov. 26, 2008, in the Japan Patent Office, of which the contents are incorporated herein by reference.

BACKGROUND OF THE INVENTION

1. Field of the Invention

The present invention relates to a fuel cell formed by stacking a membrane electrode assembly and a separator. The membrane electrode assembly includes pair of electrodes and an electrolyte membrane interposed between the electrodes. A reactant gas flow field is formed in the fuel cell for supplying a reactant gas along an electrode surface. An inlet buffer is connected to an inlet of the reactant gas flow field. An outlet buffer is connected to an outlet of the reactant gas flow field.

2. Description of the Related Art

For example, a solid polymer electrolyte fuel cell employs a membrane electrode assembly (MEA) which includes an anode, a cathode, and an electrolyte membrane interposed between the anode and the cathode. The electrolyte membrane is a polymer ion exchange membrane. The membrane electrode assembly and separators sandwiching the membrane electrode assembly make up a unit of a power generation cell for generating electricity. In use, normally, a predetermined numbers of power generation cells are stacked together to form a fuel cell stack.

In the fuel cell, a fuel gas flow field (reactant gas flow field) for supplying a fuel gas to the anode, and an oxygen-containing gas flow field (reactant gas flow field) for supplying an oxygen-containing gas to the cathode are formed in the surfaces of the separator. Further, a coolant flow field as a passage of a coolant is formed along the surfaces of the separators for each power generation cell or for every predetermined number of power generation cells.

The fuel cell may adopt internal manifold structure in which reactant gas supply passages and reactant gas discharge passages, a coolant supply passage, and a coolant discharge passage extending through the separators are provided in the fuel cell.

In the fuel cell of this type, in general, an inlet buffer is provided between the reactant gas supply passage and the reactant gas flow field for supplying the reactant gas such that the reactant gas is distributed uniformly to the reactant gas flow field. Further, an outlet buffer is provided between the reactant gas flow field and the reactant gas discharge passage for discharging the reactant gas such that the reactant gas is merged uniformly into the reactant gas discharge passage.

Figure 10:
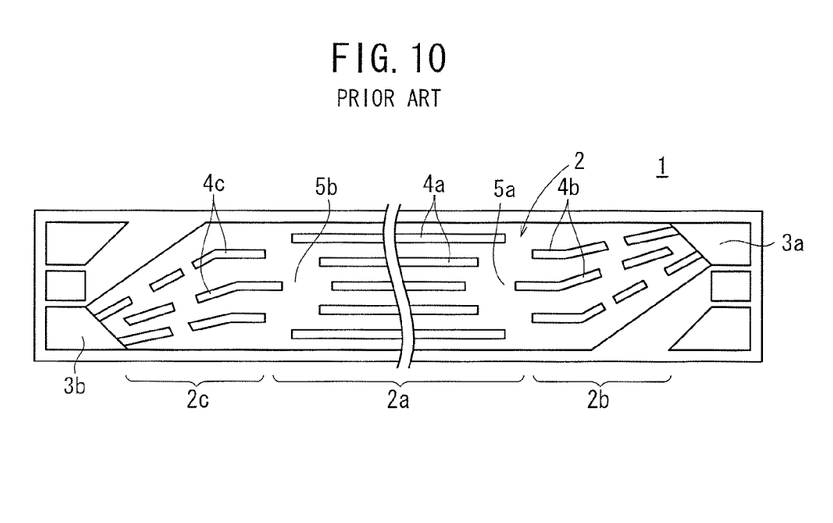
FIG. 10 is a front view showing a fuel cell separator disclosed in Japanese Laid-open Patent Publication No. 2006-172924.

For example, in Japanese Laid-Open Patent Publication 2006-172924, as shown in FIG. 10, a gas flow field 2 of a separator 1 includes a main flow field area 2a, a distribution area 2b, and a merge area 2c. The main flow field area 2a has a flow field width wider than the channel width at the inlet to an inlet manifold 3a and the channel width at the outlet to an outlet manifold 3b, and has ribs 4a dividing the flow field into a plurality of parts. In the distribution area 2b, ribs 4b are provided between the inlet to the inlet manifold 3a and the main flow field area 2a for dividing the flow field into a plurality of parts. In the merge area 2c, ribs 4c are provided between the outlet to the outlet manifold 3b and the main flow field area 2a for dividing the flow field into a plurality of parts.

Gaps 5a, 5b for re-distribution and re-merging are provided between the ends of the ribs 4b, 4c and the ribs 4a of the main flow field area 2a.

At least one of the ribs 4b, 4c dividing the flow field extends from the main flow field area 2a, the distribution area 2b, or the merge area 2c to each of longitudinal positions on the separator 1 where the gaps 5a, 5b for re-distribution and re-merging are present.

In the conventional technique, the distribution area 2b and the merge area 2c have the same structure. Therefore, the distribution area 2b and the merge area 2c have the same flow resistance. In particular, in the case where the gas flow field 2 is a fuel gas flow field for supplying pure hydrogen to the anode, the hydrogen is consumed in the fuel gas flow field by power generation, and the flow rate in the outlet side of the fuel gas flow field becomes small in comparison with the inlet side of the fuel gas flow field.

In the conventional technique, the pressure loss in the distribution area 2b is larger than the pressure loss in the merge area 2c, and the hydrogen is supplied to the portion of the flow field near the inlet manifold 3a preferentially. In the portion of the flow field remote from the inlet manifold 3a, hydrogen shortage occurs. Accordingly, the power generation performance is lowered, and degradation of the electrode may occur.

SUMMARY OF THE INVENTION

The present invention has been made to solve the problem of this type, and an object of the present invention is to provide a fuel cell in which a reactant gas is distributed uniformly to a reactant gas flow field connected to an inlet buffer and an outlet buffer, and the power generation performance is maintained suitably with simple structure.

The present invention relates to a fuel cell formed by stacking a membrane electrode assembly and a separator. The membrane electrode assembly includes a pair of electrodes and an electrolyte membrane interposed between the electrodes. A reactant gas flow field is formed in the fuel cell for supplying a reactant gas along an electrode surface of the electrodes. An inlet buffer is connected to an inlet of the reactant gas flow field. An outlet buffer is connected to an outlet of the reactant gas flow field.

The pressure loss in the inlet buffer is smaller than the pressure loss in the outlet buffer.

In the present invention, when the reactant gas is consumed in the reactant gas flow field, the pressure loss in the inlet buffer becomes equal to the pressure loss in the outlet buffer, and thus, the reactant gas is distributed uniformly to the reactant gas flow field. Therefore, with the simple structure, the desired power generation performance is maintained suitably.

The above and other objects, features and advantages of the present invention will become more apparent from the following description when taken in conjunction with the accompanying drawings in which preferred embodiments of the present invention are shown by way of illustrative example.

DESCRIPTION OF THE PREFERRED EMBODIMENTS

Figure 1:
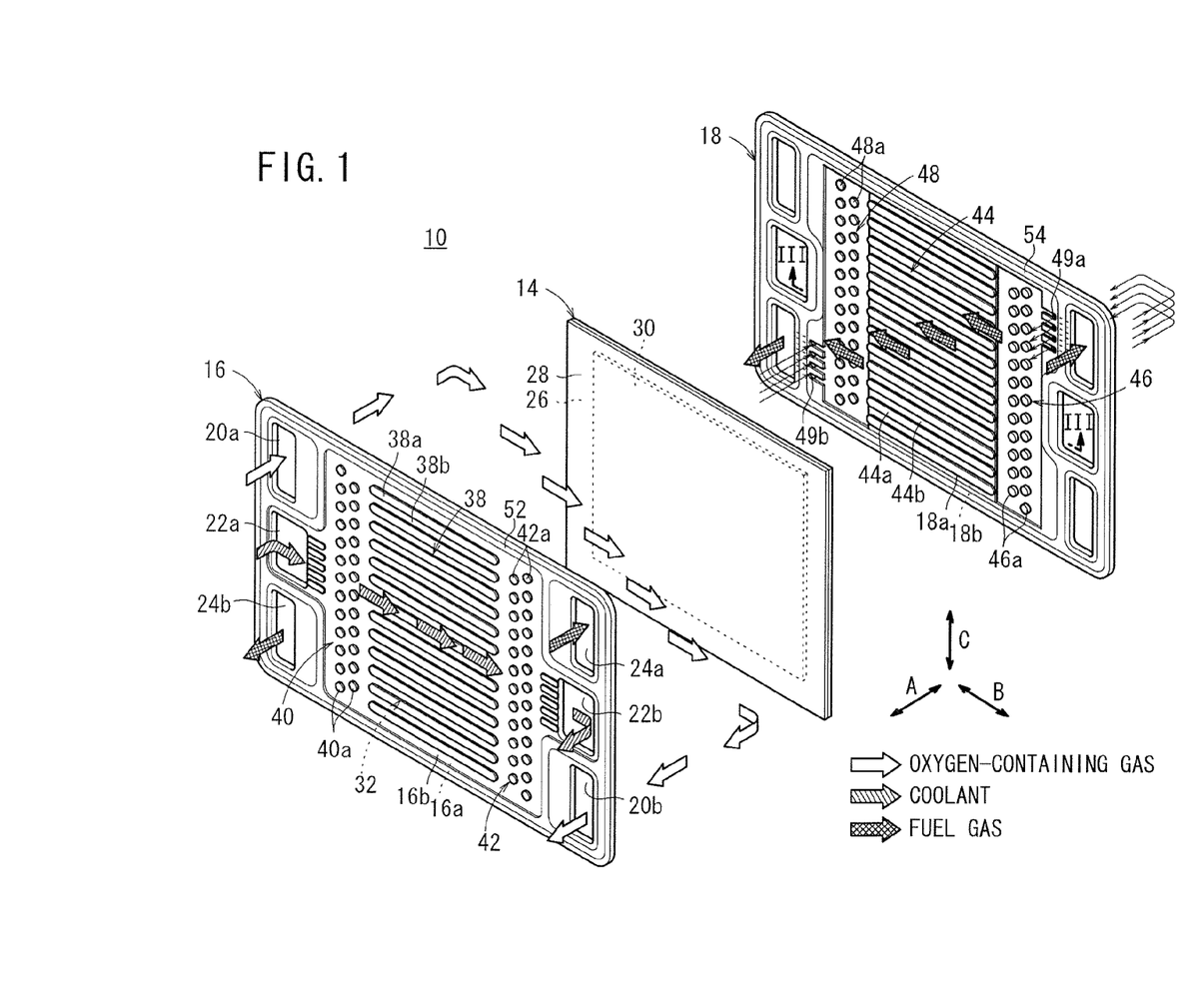
FIG. 1 is an exploded perspective view showing a fuel cell according to a first embodiment of the present invention.

As shown in FIG. 1, a fuel cell 10 according to a first embodiment of the present invention is formed by sandwiching a membrane electrode assembly 14 between a first separator (cathode side separator) 16 and a second separator (anode side separator) 18. For example, the first and second separators 16, 18 are carbon separators. Alternatively, the first and second separators 16 may be steel plates, stainless steel plates, aluminum plates, plated steel sheets, or metal plates having anti-corrosive surfaces by surface treatment.

At one end of the fuel cell 10 in a horizontal direction indicated by an arrow B in FIG. 1, an oxygen-containing gas supply passage 20a for supplying an oxygen-containing gas (reactant gas), a coolant supply passage 22a for supplying a coolant, and a fuel gas discharge passage 24b for discharging a fuel gas (reactant gas) such as a hydrogen-containing gas are arranged in a vertical direction indicated by an arrow C. The oxygen-containing gas supply passage 20a, the coolant supply passage 22a, and the fuel gas discharge passage 24b extend through the fuel cell 10 in a direction indicated by an arrow A.

At the other end of the fuel cell 10 in the direction indicated by the arrow B, a fuel gas supply passage 24a for supplying the fuel gas, a coolant discharge passage 22b for discharging the coolant, and an oxygen-containing gas discharge passage 20b for discharging the oxygen-containing gas are arranged in the direction indicated by the arrow C. The fuel gas supply passage 24a, the coolant discharge passage 22b, and the oxygen-containing gas discharge passage 20b extend through the fuel cell 10 in the direction indicated by the arrow A.

The membrane electrode assembly 14 includes a cathode 28, an anode 30, and a solid polymer electrolyte membrane 26 interposed between the cathode 28 and the anode 30. The solid polymer electrolyte membrane 26 is formed by impregnating a thin membrane of perfluorosulfonic acid with water, for example. The surface area of the anode 30 is smaller than the surface area of the cathode 28.

Each of the cathode 28 and the anode 30 has a gas diffusion layer (not shown) such as a carbon paper, and an electrode catalyst layer (not shown) of platinum alloy supported on porous carbon particles. The carbon particles are deposited uniformly on the surface of the gas diffusion layer. The electrode catalyst layer of the cathode 28 and the electrode catalyst layer of the anode 30 are formed on both surfaces of the solid polymer electrolyte membrane 26, respectively.

Figure 2:
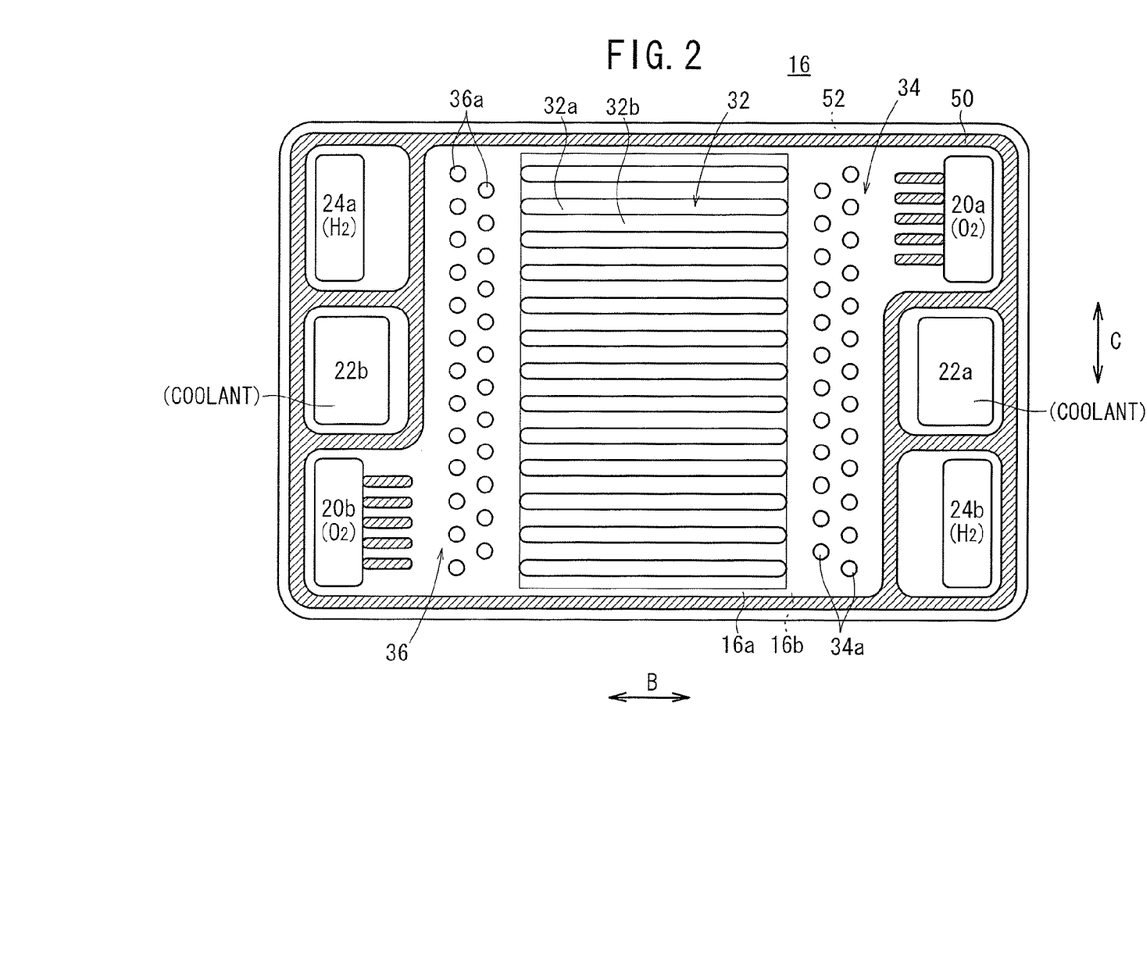
FIG. 2 is a front view showing a first separator of the fuel cell.

The first separator 16 has an oxygen-containing gas flow field (reactant gas flow field) 32 on its surface 16a facing the membrane electrode assembly 14. As shown in FIG. 2, the oxygen-containing gas flow field 32 comprises a plurality of straight flow grooves 32b. The straight flow grooves 32b are formed between a plurality of straight ridges 32a extending in the direction indicated by the arrow B.

An inlet buffer 34 is connected to the inlet of the oxygen-containing gas flow field 32, and an outlet buffer 36 is connected to the outlet of the oxygen-containing gas flow field 32. A plurality of bosses 34a are formed in the inlet buffer 34, and a plurality of bosses 36a are formed in the outlet buffer 36.

As shown in FIG. 1, the first separator 16 has a coolant flow field 38 on its surface 16b opposite to the surface 16a. The coolant flow field 38 comprises a plurality of straight flow grooves 38b. The straight flow grooves 38b are formed between a plurality of straight ridges 38a extending in the direction indicated by the arrow B. An inlet buffer 40 and an outlet buffer 48 are connected to the coolant flow field 38. A plurality of bosses 40a are formed in the inlet buffer 40, and a plurality of bosses 42a are formed in the outlet buffer 42.

The second separator 18 has a fuel gas flow field (reactant gas flow field) 44 on its surface 18a facing the membrane electrode assembly 14. The fuel gas flow field 44 comprises a plurality of straight flow grooves 44b. The flow grooves 44b are formed between a plurality of straight ridges 44a extending in the direction indicated by the arrow B.

An inlet buffer 46 is connected to the inlet of the fuel gas flow field 44, and the outlet buffer 48 is connected to the outlet of the fuel gas flow field 44. A plurality of bosses 46a are formed in the inlet buffer 46, and a plurality of bosses 48a are formed in the outlet buffer 48.

In the second separator 18, a plurality of supply holes 49a are formed near the fuel gas supply passage 24a, and a plurality of discharge holes 49b are formed near the fuel gas discharge passage 24b. The supply holes 49a are connected to the fuel gas supply passage 24a on the surface 18b, and connected to the inlet buffer 46 on the surface 18a. Likewise, the discharge holes 49b are connected to the fuel gas discharge passage 24b on the surface 18b, and connected to the outlet buffer 48 on the surface 18a.

Figure 3:
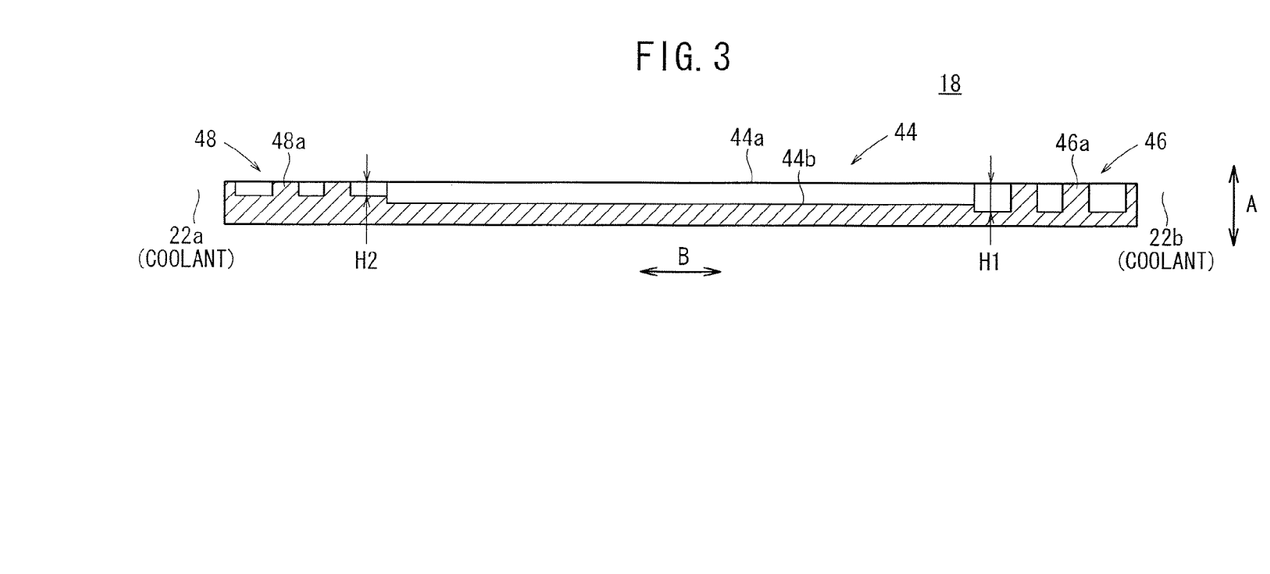
FIG. 3 is a cross sectional view taken along a line III-III in FIG. 1, showing a second separator of the fuel cell.

In the fuel gas flow field 44, the pressure loss in the inlet buffer 46 is determined such that it becomes smaller than the pressure loss in the outlet buffer 48. In the first embodiment, as shown in FIG. 3, the depth H1 of the inlet buffer 46 is larger than the depth H2 of the outlet buffer 48 (H1>H2).

Assuming that the flow rate at the inlet of the fuel gas flow field is Q1, and the flow rate at the outlet of the fuel gas flow field is Q2, in order to make the pressure loss in the inlet buffer 46 equal to the pressure loss in the outlet buffer 48, the depth H1 in the inlet buffer 46 and the depth H2 in the outlet buffer 48 are determined based on the relationship of $H1/H2 = \sqrt[3]{(Q1/Q2)}$.

In the oxygen-containing gas flow field 32, as necessary, as in the case of the fuel gas flow field 44, the pressure loss in the inlet buffer 34 is determined such that it becomes smaller than the pressure loss in the outlet buffer 36.

As shown in FIGS. 1 and 2, seal members 50, 52 such as gaskets are provided along the outer edge of the surfaces 16a, 16b of the first separator 16. As shown in FIG. 1, a seal member 54 such as a gasket is provided along the outer edge of the surface 18a of the second separator 18.

Operation of the fuel cell 10 will be described below.

Firstly, as shown in FIG. 1, an oxygen-containing gas is supplied to the oxygen-containing gas supply passage 20a, a fuel gas such as a hydrogen-containing gas is supplied to the fuel gas supply passage 24a. Further, a coolant such as pure water, ethylene glycol, or oil is supplied to the coolant supply passage 22a.

Thus, as shown in FIG. 2, the oxygen-containing gas from the oxygen-containing gas supply passage 20a flows into the inlet buffer 34 of the first separator 16. The oxygen-containing gas from the inlet buffer 34 is distributed into the flow grooves 32b of the oxygen-containing gas flow field 32. The oxygen-containing gas flows along the respective flow grooves 32b in the direction indicated by the arrow B, and the oxygen-containing gas is supplied to the cathode 28 of the membrane electrode assembly 14.

As shown in FIG. 1, the fuel gas from the fuel gas supply passage 24a flows from the surface 18b to the surface 18a of the second separator 18 through the supply holes 49a, and the fuel gas flows into the inlet buffer 46. The fuel gas from the inlet buffer 46 is distributed into the flow grooves 44b of the fuel gas flow field 44. The fuel gas flows along the flow grooves 44b in the direction indicated by the arrow B, and the fuel gas is supplied to the anode 30 of the membrane electrode assembly 14.

Thus, in each of the membrane electrode assemblies 14, the oxygen-containing gas supplied to the cathode 28, and the fuel gas supplied to the anode 30 are consumed in the electrochemical reactions at catalyst layers of the cathode 28 and the anode 30 for generating electricity.

As shown in FIG. 2, the oxygen-containing gas flowing along the flow grooves 32b is merged in the outlet buffer 36, and then, discharged to the oxygen-containing gas discharge passage 20b. Further, as shown in FIG. 1, the fuel gas flowing along the flow grooves 44b is merged in the outlet buffer 48, and then, discharged into the fuel gas discharge passage 24b through the discharge holes 49b.

Further, the coolant from the coolant supply passage 22a flows into the inlet buffer 40 between the first separator 16 and the second separator 18. The coolant is supplied from the inlet buffer 40 to the flow grooves 38b of the coolant flow field 38. The coolant flows along the flow grooves 38b in the direction indicated by the arrow B. After coolant cools the power generation surfaces of the membrane electrode assembly 14, the coolant is merged in the outlet buffer 42, and discharged to the coolant discharge passage 22b.

In the structure, in particular, in the fuel gas flow field 44, the fuel gas supplied to the fuel gas flow field 44 is consumed in the power generation reaction. Thus, the inlet flow rate Q1 of the fuel gas becomes lower than the outlet flow rate Q2 of the fuel gas (Q1>Q2). Thus, the flow resistance in the outlet buffer 48 becomes low.

In consideration of the above, in the first embodiment, the pressure loss in the inlet buffer 46 is smaller than the pressure loss in the outlet buffer 48. Specifically, as shown in FIG. 3, the depth H1 of the inlet buffer 46 is larger than the depth H2 of the outlet buffer 48 (H1>H2).

Thus, when the fuel gas is consumed in the fuel gas flow field 44 by power generation, the pressure loss in the inlet buffer 46 becomes equal to the pressure loss in the outlet buffer 48. Therefore, the fuel gas is equally distributed to the fuel gas flow field 44. With the simple structure, the desired power generation performance is maintained suitably.

Figure 4:
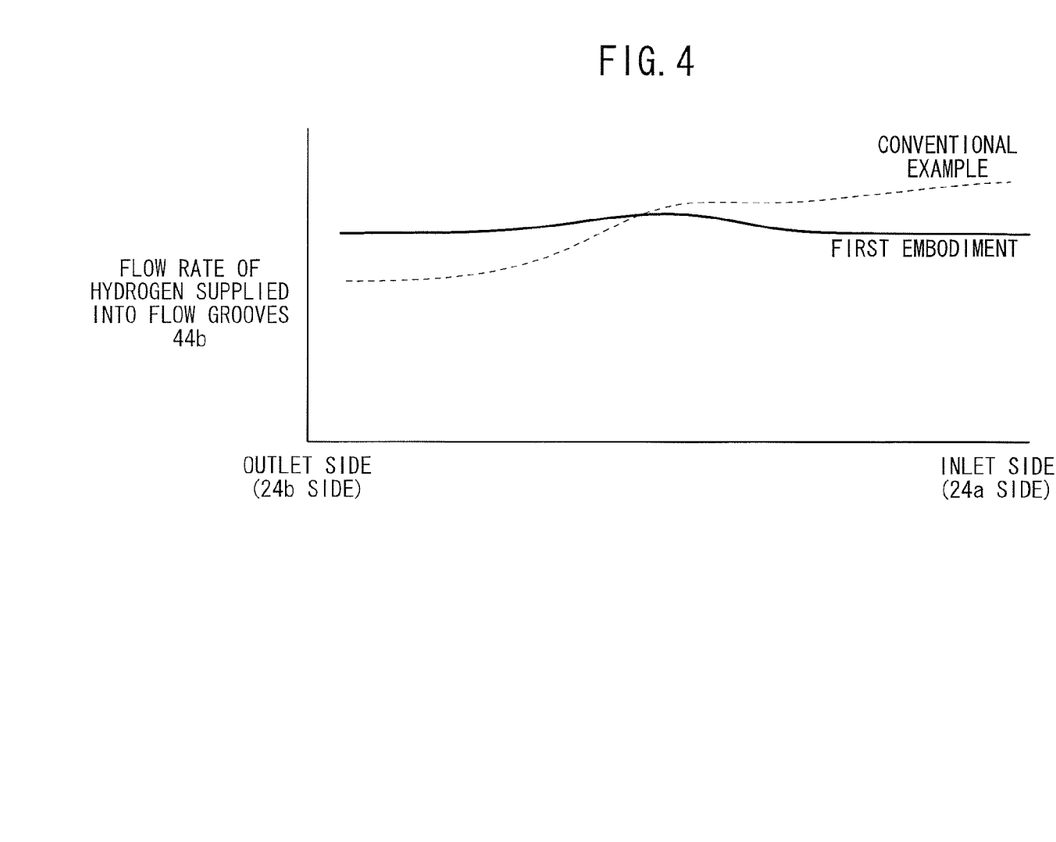
FIG. 4 is a graph showing the change in the fuel gas flow rate from the inlet side to the outlet side of flow grooves in each of a conventional example and the first embodiment.

FIG. 4 shows the change in the fuel gas flow rate (hydrogen flow rate) from the inlet side to the outlet side of the flow grooves 44b in each of a conventional example where the pressure loss in the inlet buffer is equal to the pressure loss in the outlet buffer and the first embodiment. As can be seen from FIG. 4, in the conventional example, the flow rate of the fuel gas becomes small as it gets closer to the outlet side of the flow grooves 44b. In contrast, in the first embodiment, the fuel gas flow rate is uniform over the entire area of the flow grooves 44b.

Also in the oxygen-containing gas flow field 32, the pressure loss in the inlet buffer 34 is determined such that it becomes smaller than the pressure loss in the outlet buffer 36. Thus, the same advantages as in the case of the fuel gas flow field 44 is obtained.

Figure 5:
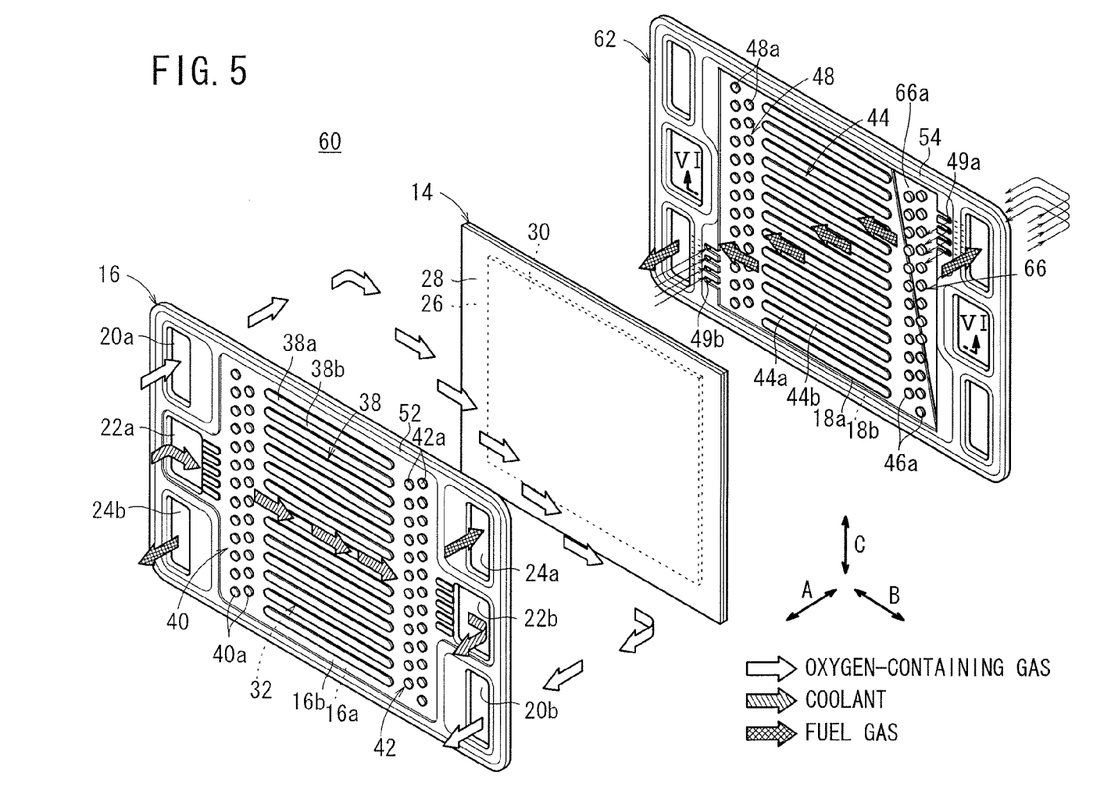
FIG. 5 is an exploded perspective view showing a fuel cell according to a second embodiment of the present invention.

FIG. 5 is an exploded perspective view showing a fuel cell 60 according to a second embodiment of the present invention. The constituent elements that are identical to those of the fuel cell 10 according to the first embodiment are labeled with the same reference numerals, and description thereof will be omitted. Further, also in third and fourth embodiments as described later, the constituent elements that are identical to those of the fuel cell 10 according to the first embodiment are labeled with the same reference numerals, and description thereof will be omitted.

The fuel cell 60 is formed by sandwiching a membrane electrode assembly 14 between a first separator 16 and a second separator (anode side separator) 62. The second separator 62 has an inlet buffer 66 connected to the inlet of the fuel gas flow field 44, and an outlet buffer 48 connected to the outlet of the fuel gas flow field 44.

Figure 6:
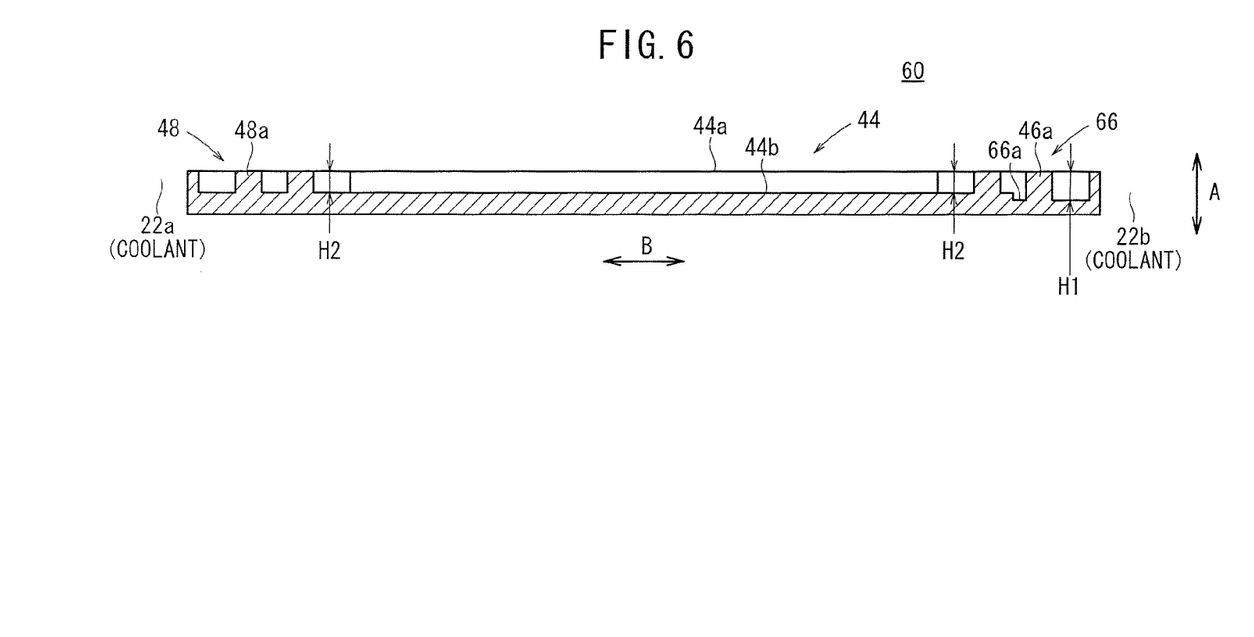
FIG. 6 is a cross sectional view taken along a line VI-VI in FIG. 5, showing a second separator of the fuel cell.

As shown in FIGS. 5 and 6, a deep groove area 66a having a large depth H1 is formed at least in part of the inlet buffer 66. The deep groove area 66a becomes narrow, as it gets remoter from the fuel gas supply passage 24a. That is, the deep groove area 66a has a substantially triangular shape. The depth in the other portion of the inlet buffer 66 is determined to be equal to the depth H2 in the outlet buffer 48 (H1>H2).

In the second embodiment, the deep groove area 66a is formed at least in part of the inlet buffer 66. Thus, the pressure loss in the inlet buffer 66 is smaller than the pressure loss in the outlet buffer 48. Therefore, when the fuel gas is consumed in the fuel gas flow field 44 by power generation, the pressure loss in the inlet buffer 66 becomes equal to the pressure loss in the outlet buffer 48. Accordingly, the same advantages as in the case of the first embodiment are obtained.

Figure 7:
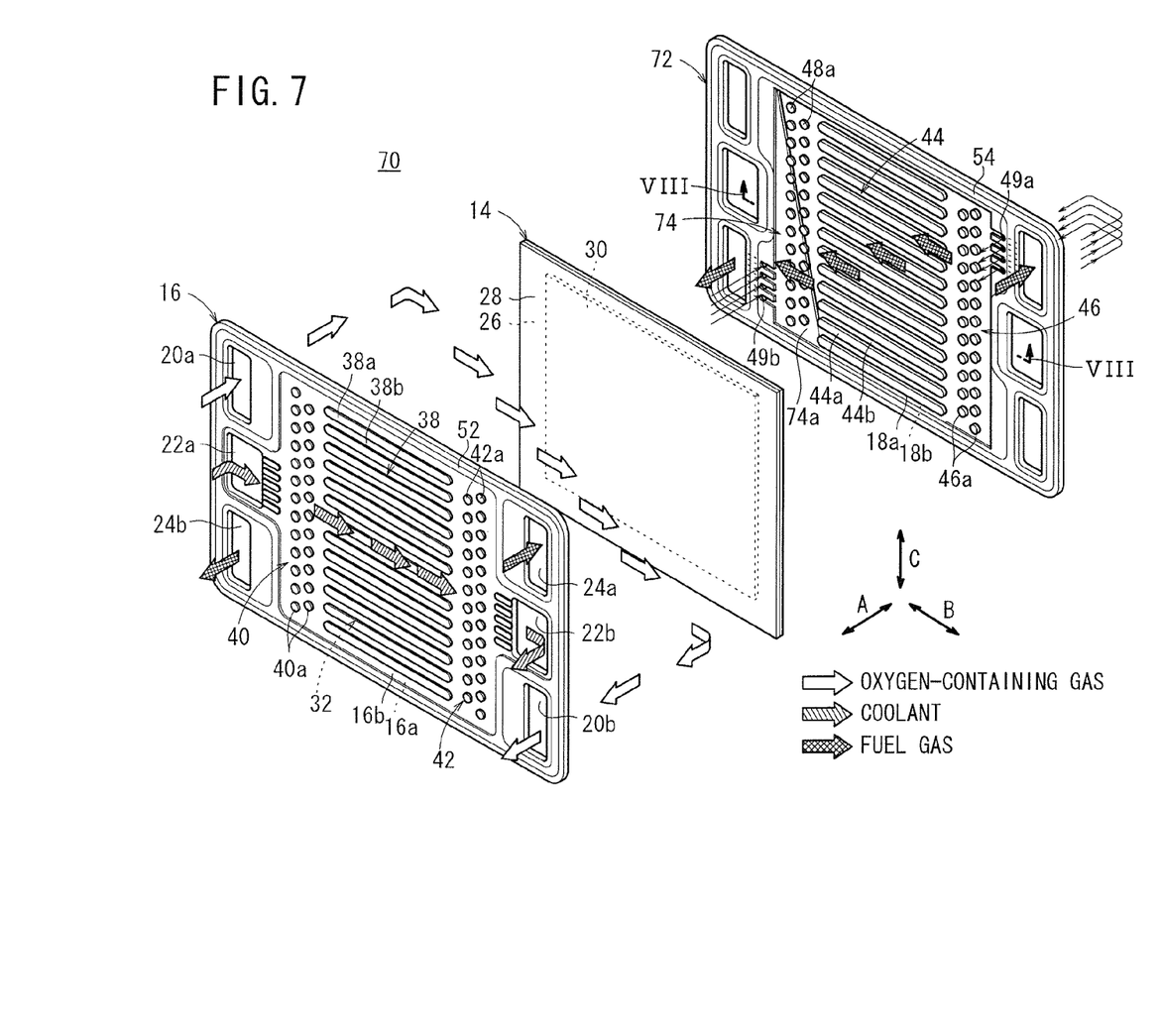
FIG. 7 is an exploded perspective view showing a fuel cell according to a third embodiment of the present invention.

FIG. 7 is an exploded perspective view showing a fuel cell 70 according to a third embodiment of the present invention.

The fuel cell 70 is formed by sandwiching a membrane electrode assembly 14 between a first separator 16 and a second separator (anode side separator) 72. The second separator 72 has an inlet buffer 46 connected to the inlet of the fuel gas flow field 44 and an outlet buffer 74 connected to the outlet of the fuel gas flow field 44.

Figure 8:
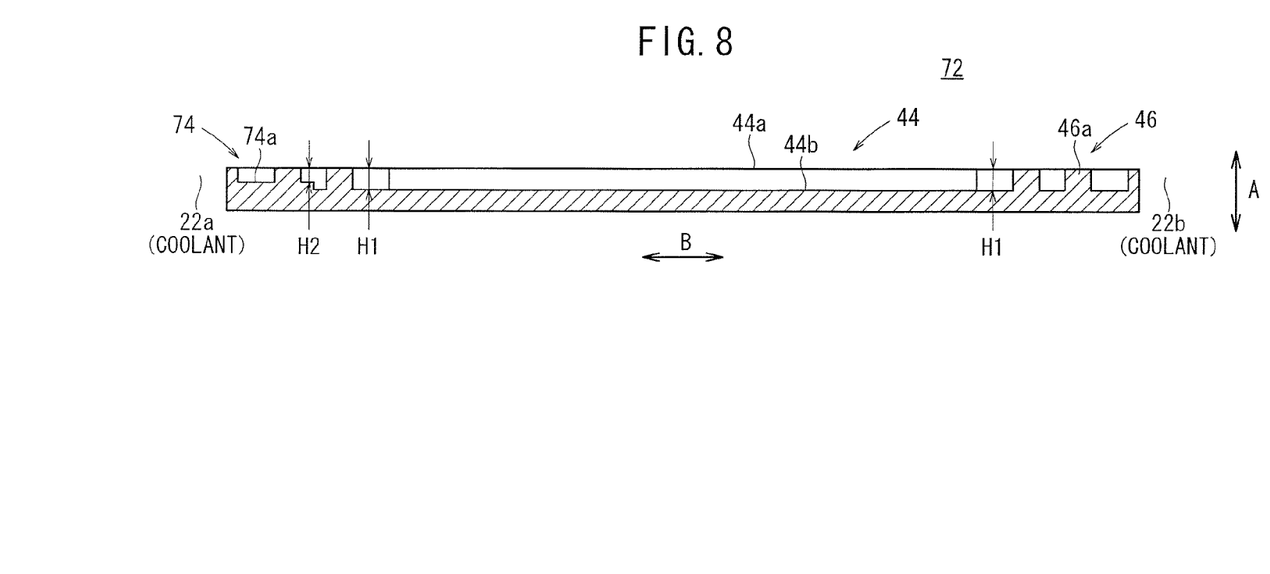
FIG. 8 is a cross sectional view taken along a line VIII-VIII in FIG. 7, showing a second separator of the fuel cell.

As shown in FIGS. 7 and 8, a shallow groove area 74a having a small depth H2 is formed at least in part of the outlet buffer 74. The shallow groove area 74a becomes narrow as it gets remoter from the fuel gas discharge passage 24b. That is, the shallow groove area 74a has a substantially triangular shape. The depth in the other portion of the outlet buffer 74 is determined to be equal to the depth H1 in the inlet buffer 46 (H1>H2).

In the third embodiment, the shallow groove area 74a is formed at least in part of the outlet buffer 74. Thus, the pressure loss in the inlet buffer 46 is smaller than the pressure loss in the outlet buffer 74. Therefore, when the fuel gas is consumed in the in the fuel gas flow field 44 by power generation, the pressure loss in the inlet buffer 46 becomes equal to the pressure loss in the outlet buffer 74. Accordingly, the same advantages as in the case of the first and second embodiments are obtained.

Figure 9:
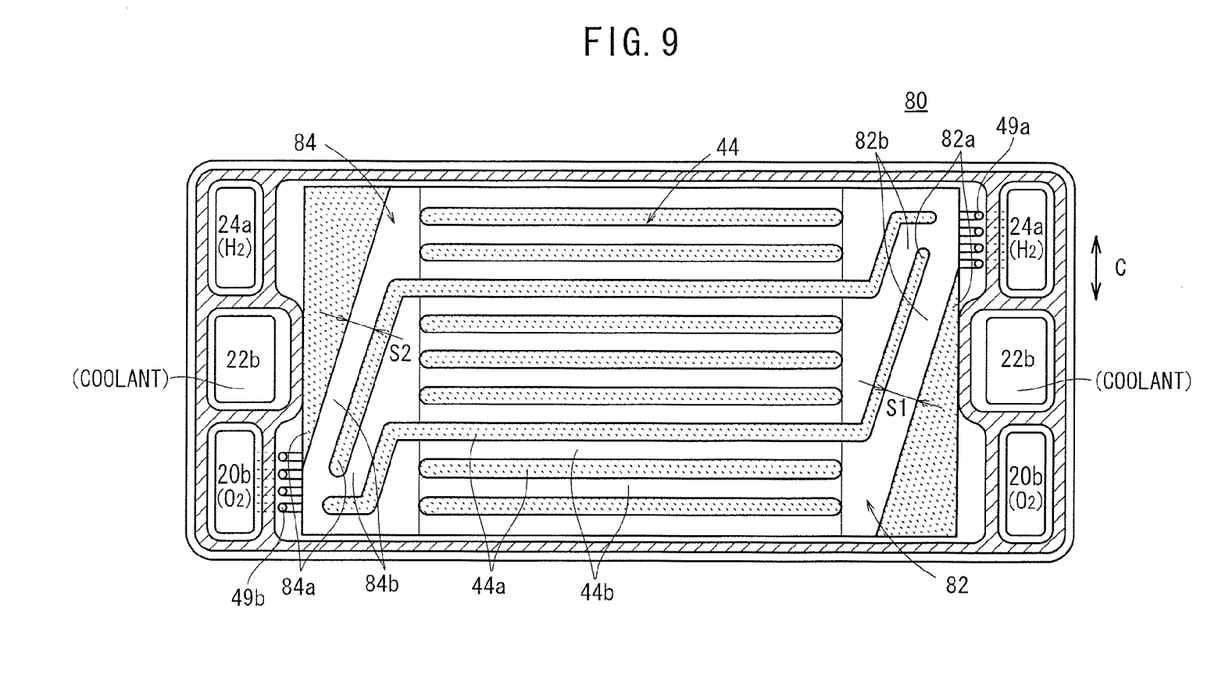
FIG. 9 is a front view showing a second separator of a fuel cell according to a fourth embodiment of the present invention.

FIG. 9 is a front view showing a second separator (anode side separator) 80 of a fuel cell according to a fourth embodiment of the present invention.

The second separator 80 has an inlet buffer 82 connected to the inlet of the fuel gas flow field 44 and an outlet buffer 84 connected to the outlet of the fuel gas flow field 44.

The inlet buffer 82 has a plurality of grooves 82*b* formed by protrusions 82*a* such as curved narrow ridges and a substantially triangular block. Likewise, the outlet buffer 84 has a plurality of grooves 84*b* formed by protrusions 84*a* such as curved narrow ridges and a substantially triangular block. The groove width S1 of the grooves 82*b* is wider than the groove width S2 of the grooves 84*b* (S1>S2). Thus, the pressure loss in the inlet buffer 82 is smaller than the pressure loss in the outlet buffer 84.

In the fourth embodiment, since the grooves 82*b* of the inlet buffer 82 are wider than the grooves 84*b* of the outlet buffer 84, the pressure loss in the inlet buffer 82 is smaller than the pressure loss in the outlet buffer 84. Therefore, when the fuel gas is consumed in the in the fuel gas flow field 44 by power generation, the pressure loss in the inlet buffer 82 becomes equal to the pressure loss in the outlet buffer 84. Accordingly, the same advantages as in the case of the first to third embodiments are obtained.

While the invention has been particularly shown and described with reference to preferred embodiments, it will be understood that variations and modifications can be effected thereto by those skilled in the art without departing from the scope of the invention as defined by the appended claims.

What is claimed is:

1. A fuel cell comprising:
   a stacked membrane electrode assembly and separators, the membrane electrode assembly including a pair of electrodes and an electrolyte membrane interposed between the electrodes,
   a reactant gas flow field supplying a reactant gas along an electrode surface, the reactant gas flow field including a plurality of flow grooves,
   an inlet buffer being connected to inlets of the flow grooves in the reactant gas flow field, the inlet buffer uniformly distributing the reactant gas to the flow grooves in the reactant gas flow field, and
   an outlet buffer being connected to outlets of the flow grooves in the reactant gas flow field, the outlet buffer discharging the reactant gas from the flow grooves so that the reactant gas is merged uniformly into a reactant gas discharge passage, the widths of the inlet buffer, the outlet buffer and the reactant gas flow field being substantially the same in a direction along which the inlets and outlets of the flow grooves are aligned,
   wherein cross-sectional areas of the inlets and the outlets of the flow grooves in the reactant gas flow field are substantially identical to each other,
   wherein the flow grooves in the reactant gas flow field have a constant depth from the inlets to the outlets of the grooves, and
   wherein at least part of the inlet buffer is deeper than at least part of the outlet buffer such that the pressure loss of the reactant gas in the inlet buffer before being subjected to power generation becomes equal to the pressure loss of the reactant gas in the outlet buffer after being subjected to the power generation, a depth H1 in the at least part of the inlet buffer and a depth H2 in the at least part of the outlet buffer being determined based on a relationship of $H1/H2 = \sqrt[3]{Q1/Q2}$ where Q1 is a flow rate at an inlet of the reactant gas flow field and Q2 is a flow rate at an outlet of the reactant gas flow field.

2. A fuel cell according to claim 1, wherein the inlet buffer is deeper than the outlet buffer.

3. A fuel cell according to claim 1, wherein at least part of the outlet buffer is shallower than the inlet buffer, the outlet buffer including an area with a shallow groove area formed in at least part of the outlet buffer that is shallower than the rest of the outlet buffer and the inlet buffer, and the shallow grooves area becomes narrower as they get remoter from the reactant gas discharge passage.

4. A fuel cell according to claim 1, wherein the reactant gas flow field is a fuel gas flow field.

* * * * *